Figure 1:
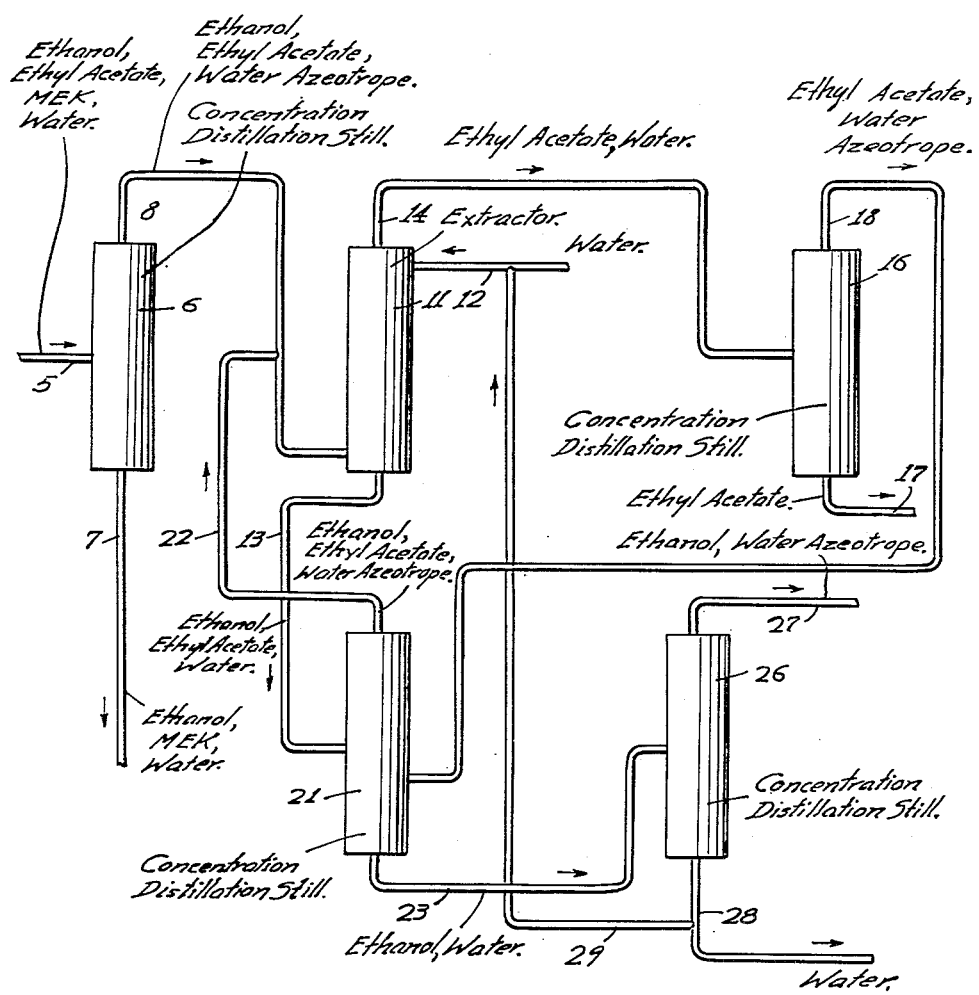

2,702,783

PROCESS OF SEPARATING MIXTURES OF ORGANIC COMPOUNDS

James M. Harrison, Oakmont, and Allen E. Somers, Pittsburgh, Pa., assignors to Gulf Research & Development Company, Pittsburgh, Pa., a corporation of Delaware Application March 14, 1952, Serial No. 276,616

12 Claims. (Cl. 202—42)

This invention relates to a process for separating aqueous or non-aqueous mixtures of lower molecular weight oxygenated organic compounds. More particularly, this invention relates to a process for separating into components a mixture of ethanol, ethyl acetate, methyl ethyl ketone, and water.

A mixture of ethanol, ethyl acetate, methyl ethyl ketone, and water is obtained for example during the initial separation by distillation of Fischer-Tropsch oxygenated products into separate products and groups of products. A mixture of ethanol, ethyl acetate, methyl ethyl ketone and water is difficult to separate by distillation because the organic compounds boil within a range of 77.1 to 79.6° C. at atmospheric pressure and because they form a number of azeotropes with one another. It is also difficult to separate a mixture of ethanol, ethyl acetate, methyl ethyl ketone and water obtained from a Fischer-Tropsch product because the composition of the mixture changes with changes in operating conditions and for this reason the separation scheme must be flexible so that it can be varied with changes in composition of the mixture.

We have found that a mixture of ethanol, ethyl acetate, methyl ethyl ketone and water can be efficiently separated by distilling the mixture in a first distillation zone to remove overhead an azeotropic mixture containing about 9 weight per cent ethanol, about 83 per cent ethyl acetate, and about 8 per cent water and having a boiling point of 70.3° C. at 760 mm. of Hg. Usually the mixture removed as bottoms is a ternary mixture consisting of methyl ethyl ketone and ethanol and one of ethyl acetate and water. Less frequently only one of the compounds of the azeotrope is present in the original mixture in amounts in excess of the amount needed to remove the remaining two compounds completely as an azeotrope of ethanol, ethyl acetate, and water with a boiling point of 70.3° C. at 760 mm. of Hg and the bottoms will be a binary mixture. Very rarely the initial mixture is a mixture of methyl ethyl ketone and an azeotropic mixture of ethanol, ethyl acetate and water and the bottoms consist only of methyl ethyl ketone.

In accordance with our invention the azeotropic mixture of ethanol, ethyl acetate, and water removed overhead and the bottoms can then be further separated if desired. Atmospheric pressure is employed in the first distillation zone, and in subsequent distillation zones unless otherwise indicated. The boiling points are given under standard conditions of 760 mm. of Hg because changes in pressure cause changes in the boiling point.

We have found that the azeotropic mixture of ethanol, ethyl acetate and water boiling at 70.3° C. can be further separated by a process which comprises introducing the mixture to an extraction zone, introducing water to the extraction zone, removing an extract phase containing a mixture of ethanol, ethyl acetate and water from the bottom of the extraction zone and removing a mixture of ethyl acetate and water as raffinate from the top of the extraction zone.

The raffinate, containing ethyl acetate and water, is introduced into a concentration distillation zone from which ethyl acetate is removed as bottoms and an azeotropic mixture containing 92 per cent ethyl acetate and 8 per cent water and having a boiling point of 70.4° C. is removed as overhead. The azeotropic mixture of ethyl acetate and water and the extract from the extraction zone containing ethanol, ethyl acetate and water are both introduced to a concentration distillation zone. An azeotropic mixture of ethanol, ethyl acetate and water having a boiling point of 70.3° C. is removed overhead from the concentration distillation zone and is preferably recycled to the first extraction zone. A mixture of ethanol and water is removed as bottoms from the second concentration zone. The mixture of ethanol and water can be used as such or it can be further concentrated in accordance with methods well known to those skilled in the art.

As was pointed out previously, the bottoms from the first distillation zone to which a mixture of ethanol, ethyl acetate, methyl ethyl ketone and water is introduced are a mixture of methyl ethyl ketone and no more than two of ethanol, ethyl acetate and water. When the bottoms are a mixture of ethanol, methyl ethyl ketone and water, this mixture can be separated by a process which comprises introducing the mixture into a concentration distillation zone, and removing as overhead an azeotropic mixture containing about 14 per cent ethanol, 75 per cent methyl ethyl ketone, and 11 per cent water and having a boiling point of 73.2° C. The bottoms removed from the concentration zone are usually a mixture of two of ethanol, methyl ethyl ketone and water. In special cases the compositions of the original charge mixture may be such that one of the constituents of the mixture is removed substantially pure as bottoms.

We have further found that the azeotropic mixture of ethanol, methyl ethyl ketone and water can be separated by introducing methanol and the mixture into an azeotropic distillation zone, removing as bottoms a mixture of ethanol and water, and as overhead an azeotropic mixture containing about 70 per cent methanol and about 30 per cent methyl ethyl ketone and having a boiling point of 63.8° C. The azeotropic mixture of methyl ethyl ketone and methanol is preferably separated by introducing it to a pressure distillation zone at a pressure of about 60 p. s. i. a. (pounds per square inch absolute) from which methyl ethyl ketone is removed as bottoms and methanol is removed as overhead. The mixture of ethanol and water removed as bottoms from the azeotropic distillation zone may be employed as such or it may be separated in accordance with methods well known to those skilled in the art.

As has been stated previously the bottoms removed from the concentration distillation zone are usually a binary mixture of two of ethanol, methyl ethyl ketone and water. When the bottoms are a mixture of ethanol and water, these bottoms can be combined with those from the azeotropic distillation zone and treated in the manner pointed out above.

When the bottoms from the concentration zone are a mixture of methyl ethyl ketone and water, the mixture can be separated in accordance with a process which comprises introducing the mixture to a concentration distillation zone, removing water as bottoms and an azeotropic mixture containing about 89 per cent methyl ethyl ketone and about 11 per cent water and having a boiling point of 73.5° C. as overhead. Methanol and the azeotropic mixture of methyl ethyl ketone and water are then introduced into an azeotropic distillation zone, water is removed as bottoms and an azeotropic mixture of methyl ethyl ketone and methanol with a boiling point of 63.8° C. is removed overhead. The azeotropic mixture of methyl ethyl ketone and methanol can also be introduced into a pressure distillation zone and there separated into its component parts.

When the bottoms from the concentration zone are a mixture of ethanol and methyl ethyl ketone, this mixture may be separated by a process which comprises introducing the mixture into a concentration distillation zone, removing ethanol as bottoms from the concentration distillation zone, and removing as overhead an azeotropic mixture containing about 37 per cent ethanol and 63 per cent methyl ethyl ketone and having a boiling point of 74.8° C., and further separating this azeotropic mixture by distilling it with methanol in an azeotropic distillation zone, removing an azeotrope of methyl ethyl ketone and methanol overhead and distilling it in a pressure distillation zone in the manner previously described.

When the bottoms removed from the first concentration distillation zone to which the mixture of ethanol, methyl ethyl ketone, ethyl acetate, and water is charged are a mixture of ethyl acetate, methyl ethyl ketone, and water, this mixture can be separated by a process which comprises charging the mixture to a concentration distillation zone and removing as overhead an azeotropic mixture containing about 92 per cent ethyl acetate and about 8 per cent water and having a boiling point of 70.4° C.

The bottoms removed from the concentration distillation zone to which the mixture of ethyl acetate, methyl ethyl ketone, and water is charged, change with changes in the composition of the mixture of ethanol, ethyl acetate, methyl ethyl ketone, and water charged to the first concentration distillation zone. Usually the bottoms are a mixture of methyl ethyl ketone and one of ethyl acetate and water. However, in special cases the composition of the original charge mixture may be such that ethyl acetate and water are present in azeotropic amounts and when the mixture of ethyl acetate, methyl ethyl ketone and water is distilled, all of the ethyl acetate and water are removed overhead as an azeotropic mixture and methyl ethyl ketone is removed substantially pure as bottoms.

The azeotropic mixture of ethyl acetate and water and a mixture of methyl ethyl ketone and water can each be separated in the manner previously described.

When the bottoms are a mixture of ethyl acetate and methyl ethyl ketone, the mixture can be separated by passing it to a concentration distillation zone, removing ethyl acetate as bottoms, removing an azeotropic mixture containing about 78 per cent ethyl acetate and about 22 per cent methyl ethyl ketone as overhead and having a boiling point of 76.7° C. Water and the azeotropic mixture of ethyl acetate and methyl ethyl ketone are introduced to an azeotropic distillation zone, methyl ethyl ketone is removed as bottoms and an azeotropic mixture containing about 92 per cent ethyl acetate and about 8 per cent water is removed as overhead. The azeotropic mixture of ethyl acetate and water can be separated in accordance with the process which has been described hereinabove.

When the bottoms from the first distillation zone to which a mixture of ethanol, methyl ethyl ketone, ethyl acetate and water is charged are a mixture of ethanol, methyl ethyl ketone and ethyl acetate, the mixture can be separated by passing it to an azeotropic distillation zone, introducing methanol to the azeotropic distillation zone, removing as overhead an azeotropic mixture containing about 56 per cent ethyl acetate and about 44 per cent methanol and having a boiling point of 62.3° C. and removing as bottoms a mixture of ethanol and methyl ethyl ketone. These binary mixtures may be separated in accordance with the process which has been described hereinabove.

The process of our invention can best be understood by reference to the accompanying drawings which present a simplified flow sheet of apparatus suitable for carrying out an embodiment of our invention. For the sake of simplicity, check valves, pressure and temperature control equipment and other auxiliary equipment well known to those skilled in the art have not been shown in the figures.

Referring to Figure 1, a mixture containing 564 parts ethanol, 250 parts methyl ethyl ketone, 583 parts ethyl acetate and 157 parts water is introduced by line 5 to concentration distillation still 6. A mixture containing 500 parts ethanol, 250 parts methyl ethyl ketone and 100 parts water is removed as bottoms by line 7. An azeotropic mixture containing 64 parts ethanol, 583 parts ethyl acetate and 57 parts water and having a boiling point of 70.3° C. is removed as overhead by line 8.

An azeotropic mixture of the same components containing 26 parts ethanol, 247 parts ethyl acetate, and 23 parts water recycled in the manner which will be described hereinafter is introduced by line 22 to line 8 and the resulting mixture of 90 parts ethanol, 830 parts ethyl acetate and 80 parts water is introduced to extractor 11. 500 parts water are introduced into extractor 11 by line 12. An extract phase containing 90 parts ethanol, 68 parts ethyl acetate and 564 parts water is removed from the bottom of extractor 11 by line 13. A raffinate phase containing 762 parts ethyl acetate and 16 parts water is removed from the top of extractor 11 by line 14.

The raffinate phase is introduced by line 14 into concentration distillation still 16. 583 parts ethyl acetate are removed as bottoms from concentration distillation still 16 by line 17 and are discharged as product. An azeotropic mixture containing 179 parts ethyl acetate and 16 parts water and having a boiling point of 70.4° C. is removed overhead from concentration distillation still 16 by line 18 and is passed by this line to concentration still 21. The extract phase in line 13 containing 90 parts ethanol, 68 parts ethyl acetate and 564 parts water also is passed by line 13 to concentration distillation still 21. An azeotropic mixture containing 26 parts ethanol, 247 parts ethyl acetate and 23 parts water and having a boiling point of 70.3° C. is removed as overhead from concentration distillation still 21 by line 22 and is then passed into line 8 wherein it is combined with the azeotropic mixture of the same composition in the manner previously described and is introduced as part of the resulting mixture to extractor 11. A mixture of 64 parts of ethanol and 557 parts of water is removed as bottoms from concentration distillation still 21 by line 23 and is passed by this line to concentration distillation still 26. An azeotropic mixture containing 64 parts ethanol and 3 parts water and having a boiling point of 78.1° C. is removed overhead from line 27 and is then discharged from the system for further processing in accordance with methods well known to those skilled in the art. 554 parts water are removed as bottoms from concentration distillation still 26 by line 28. 54 parts of water are discharged by line 28 and 500 parts water are recycled by line 29 to line 12 and then to extractor 11.

Figure 2:
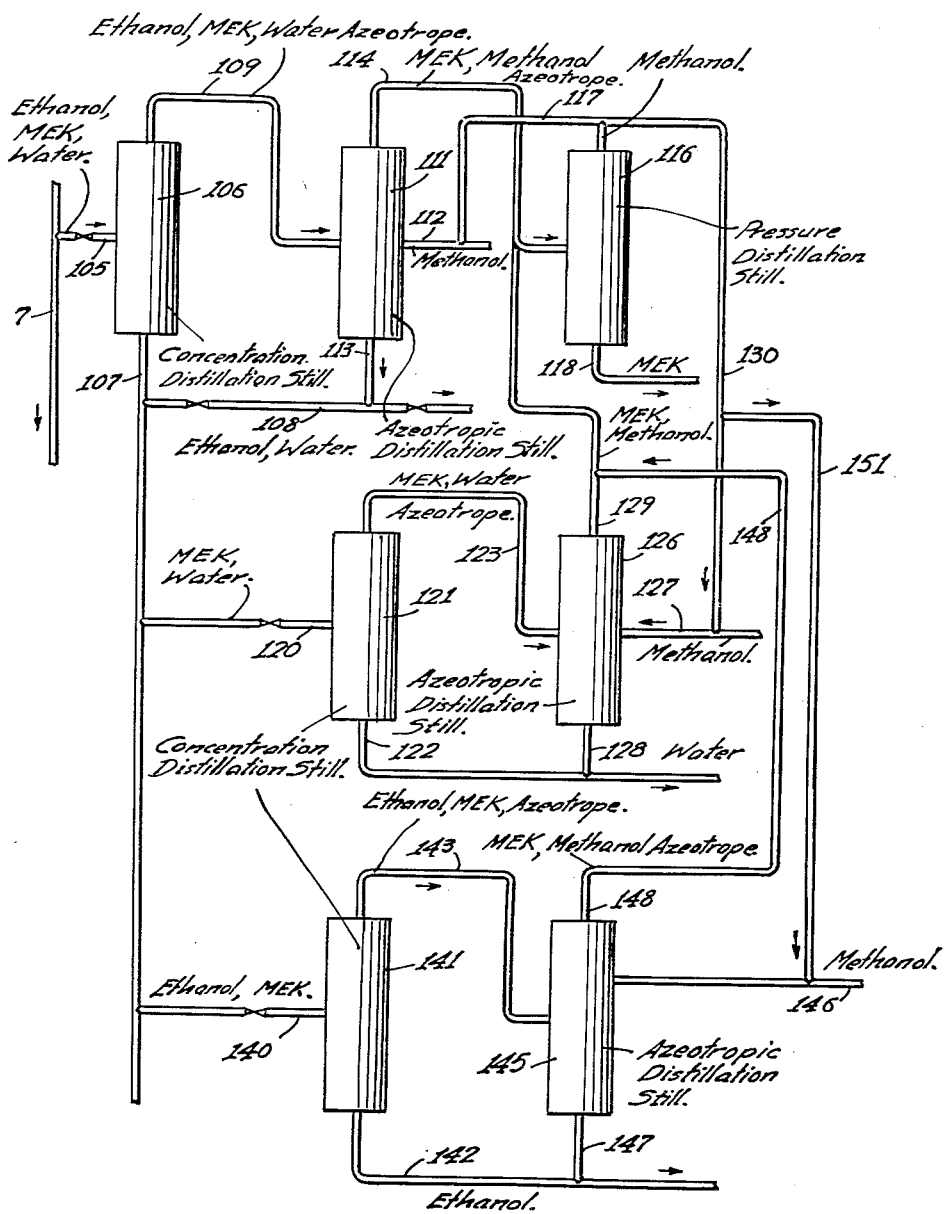

Referring to Figure 2, the mixture of 500 parts ethanol, 250 parts methyl ethyl ketone and 100 parts water removed as bottoms by line 7 is passed by line 105 to concentration distillation still 106. A mixture of ethanol and water is removed as bottoms by line 107 and is discharged by valved line 108. An azeotropic mixture containing 47 parts ethanol, 250 parts methyl ethyl ketone and 36 parts water and having a boiling point of 73.2° C. is removed as overhead from concentration distillation still 106 by line 109.

The azeotropic mixture of ethanol, methyl ethyl ketone and water is introduced into azeotropic distillation still 111, and 584 parts methanol are introduced to the same still by line 112. A mixture of ethanol and water is removed as bottoms by line 113 and is discharged by this line and line 108 as product. An azeotropic mixture containing 250 parts methanol and 584 parts methyl ethyl ketone and having a boiling point of 63.8° C. is removed overhead from azeotropic distillation still 111 by line 114 and is introduced into pressure distillation still 116. 584 parts methanol are removed overhead from pressure distillation still 116 by line 117 and are recycled by this line and line 112 to azeotropic distillation still 111. 250 parts methyl ethyl ketone are removed as bottoms from pressure distillation still 116 by line 118.

When the composition of the original charge mixture to concentration distillation still 6 is changed, the composition of the bottoms removed by line 7 from concentration still 6 is also changed. As an example of an embodiment in which a mixture of methyl ethyl ketone and water is removed by line 107, a mixture of ethanol, methyl ethyl ketone and water containing 50 parts ethanol, 350 parts methyl ethyl ketone and 100 parts water is introduced into concentration distillation still 106. The bottoms removed by line 107 contain 82 parts methyl ethyl ketone and 61 parts water. The azeotropic mixture removed overhead from the concentration distillation still 106 contains 50 parts ethanol, 268 parts methyl ethyl ketone and 39 parts water. The bottoms removed from azeotropic distillation still 111 contain 50 parts ethanol and 39 parts water and the azeotropic mixture of methyl ethyl ketone and methanol removed overhead contains 268 parts methyl ethyl ketone and 626 parts methanol. The mixture of methyl ethyl ketone and water in line 107 is passed by valved line 120 to concentration distillation still 121. Water is removed as bottoms from concentration distillation still 121 by line 122 and is discharged as product by this line. An azeotropic mixture containing 82 parts methyl ethyl ketone and 10 parts water and having a boiling point of 73.5° C. is removed overhead from concentration distillation still 121 by line 123 and is introduced into azeotropic distillation still 126 into which 191 parts methanol are also introduced by line 127. Water is removed as bottoms from azeotropic distillation still 126 by line 128 and is discharged as product by this line and line 122. An azeotropic mixture containing 82 parts methyl ethyl ketone and 191 parts methanol and having a boiling point of 63.8° C. is removed overhead from azeotropic distillation still 126 by line 129 and is combined with the mixture of 268 parts methyl ethyl ketone and 626 parts methanol in line 114. The resulting mixture of 350 parts methyl ethyl ketone and 817 parts methanol is introduced to pressure distillation still 116. 350 parts methyl ethyl ketone are removed as bottoms by line 118 and 817 parts methanol are removed as overhead by line 117. 626 parts of the methanol are recycled by line 117 to azeotropic distillation still 111. 191 parts are recycled by line 130 to still 126.

When the mixture of ethanol, methyl ethyl ketone and water introduced to concentration distillation still 106 is further changed by a change in the original charge mixture fed to concentration distillation still 6 so that the bottoms removed from still 106 contain an excess of ethanol and methyl ethyl ketone over that needed to remove all of the water as an azeotropic mixture of ethanol, methyl ethyl ketone and water, a mixture of ethanol and methyl ethyl ketone is removed by line 107.

As an example of such an embodiment a mixture containing 95 parts ethanol, 370 parts methyl ethyl ketone, and 50 parts water is introduced into concentration distillation still 106. The azeotropic mixture removed overhead contains 64 parts ethanol, 340 parts methyl ethyl ketone, and 50 parts water. 793 parts of methanol are introduced to azeotropic distillation still 111 by line 112 and the azeotropic mixture removed overhead from this still contains 340 parts methyl ethyl ketone and 793 parts methanol. A mixture containing 31 parts of ethanol and 30 parts methyl ethyl ketone is removed as bottoms from concentration distillation still 106 by line 107 and charged to distillation still 141 by line 140.

An azeotropic mixture containing 18 parts ethanol and 30 parts methyl ethyl ketone and having a boiling point of 74.8° C. is removed overhead by line 143 and is passed to azeotropic distillation still 145. 70 parts methanol are introduced by line 146 into azeotropic distillation still 145. 13 parts ethanol are removed as bottoms from still 141 and discharged as product through line 142. 18 parts ethanol are removed as bottoms from azeotropic distillation still 145 by line 147 and are discharged as product by this line and line 142. An azeotropic mixture containing 30 parts methyl ethyl ketone and 70 parts methanol and having a boiling point of 63.8° C. is removed overhead by line 148 and passed by this line and lines 129 and 114 to pressure distillation still 116.

The azeotropic mixture of 30 parts methyl ethyl ketone and 70 parts methanol is combined with 340 parts methyl ethyl ketone and 793 parts methanol in line 114. 370 parts methyl ethyl ketone are removed as bottoms from pressure distillation still 116 by line 118. 863 parts methanol are removed overhead from still 116. 793 parts are recycled to azeotropic distillation still 111 by line 117, and 70 parts are recycled by lines 130 and 151 to line 146 and still 145.

Figure 3:
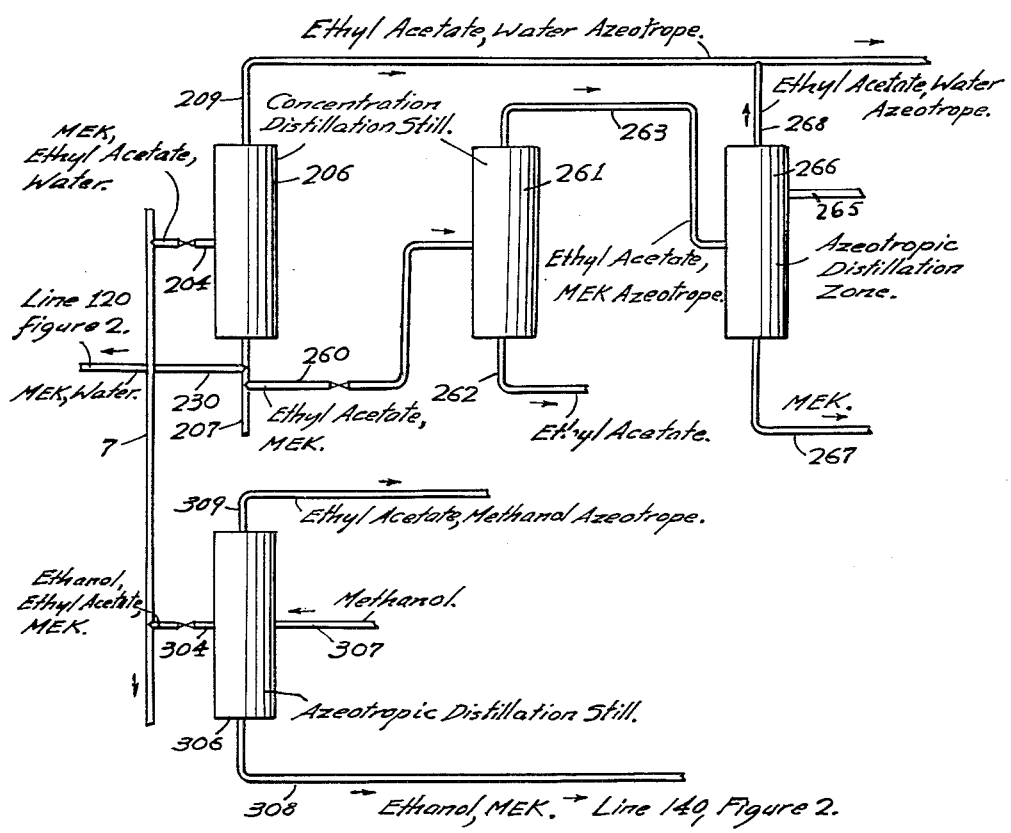

Referring to Figure 3, an example of our invention will now be described in which the composition of the mixture of ethanol, ethyl acetate, methyl ethyl ketone and water introduced to the first concentration zone is such that a mixture of ethyl acetate, methyl ethyl ketone and water is removed as bottoms from this still. As an example when the bottoms from concentration distillation still 6 contain 120 parts methyl ethyl ketone, 80 parts ethyl acetate and 40 parts water, the mixture is passed by line 7 and valved line 204 to concentration distillation still 206. A mixture of 120 parts methyl ethyl ketone and 33 parts water is removed as bottoms by line 207 and an azeotropic mixture containing 80 parts ethyl acetate and 7 parts water is removed overhead by line 209. The azeotropic mixture of ethyl acetate and water is removed from the system for further separation.

When the composition of the mixture charged to concentration distillation still 206 is such that a mixture of methyl ethyl ketone and water is removed as bottoms, this mixture is passed by line 230 to line 120 shown in Figure 2 and the mixture is separated in the manner described previously.

When the composition of the mixture of ethyl acetate, methyl ethyl ketone and water is such that the bottoms removed from concentration distillation still 206 are a mixture of ethyl acetate and methyl ethyl ketone, the mixture is passed by valved line 260 to concentration distillation still 261. As an example of such an embodiment, when a mixture containing 40 parts methyl ethyl ketone, 280 parts ethyl acetate and 10 parts water is introduced into concentration distillation still 206, a mixture of 115 parts ethyl acetate and 10 parts water is removed overhead by line 209 and is removed from the system.

A mixture of 165 parts ethyl acetate and 40 parts methyl ethyl ketone is introduced to concentration distillation still 261 by valved line 260. 23 parts ethyl acetate are removed as bottoms from concentration distillation still 261 and are discharged as product by line 262 and azeotropic mixture containing 142 parts ethyl acetate and 40 parts methyl ethyl ketone and having a boiling point of 76.7° C. is removed overhead by line 263. The azeotropic mixture of ethyl acetate and methyl ethyl ketone is introduced to azeotropic distillation still 266 and 12 parts of water are added by line 265. 40 parts methyl ethyl ketone are removed as bottoms from the still by line 267 and an azeotropic mixture containing 142 parts ethyl acetate and 12 parts water and having a boiling point of 70.4° C. is removed overhead by line 268 and is passed by this line to line 209.

When the mixture introduced into the concentration distillation still 6 contains a mixture of ethanol, methyl ethyl ketone, ethyl acetate and water such that a mixture of ethanol, methyl ethyl ketone and ethyl acetate is removed as bottoms from this still by line 7, valved line 304 is opened. As an example of such an embodiment, when a mixture containing 120 parts ethanol, 70 parts methyl ethyl ketone and 40 parts ethyl acetate is removed as bottoms by line 7, valved line 304 is opened and the mixture is introduced into azeotropic distillation still 306. 32 parts of methanol are introduced into this still by line 307. 120 parts ethanol and 70 parts methyl ethyl ketone are removed as bottoms from azeotropic distillation still 306 by line 308 and an azeotropic mixture containing 40 parts ethyl acetate and 32 parts methanol and having a boiling point of 62.3° C. is removed overhead by line 309. The azeotropic mixture of ethyl acetate and methanol is removed from the system for further separation and the methanol can be recycled. The bottoms removed from azeotropic distillation still 306 containing a mixture of ethanol and methyl ethyl ketone can be recycled to line 140 shown on Figure 2 and separated in the manner which has been previously described.

Obviously many modifications and variations of the invention as hereinbefore set forth may be made without departing from the spirit and scope thereof, and therefore only such limitations should be imposed as are indicated in the appended claims.

We claim:

1. A process which comprises introducing a mixture of ethanol, ethyl acetate, methyl ethyl ketone and water into a first distillation zone, removing as bottoms a mixture of methyl ethyl ketone and no more than two of ethanol, ethyl acetate and water, removing as overhead an azeotropic mixture of ethanol, ethyl acetate, and water, introducing water and said azeotropic mixture into an extraction zone, removing raffinate containing ethyl acetate and water and extract containing ethanol, ethyl acetate and water, introducing the raffinate into a concentration distillation zone, removing ethyl acetate as bottoms and an azeotropic mixture of ethyl acetate and water as overhead, and introducing said azeotropic mixture and the extract from the extraction zone to a second concentration distillation zone, removing a mixture of water and ethanol as bottoms from said second concentration distillation zone, and removing as overhead an azeotropic mixture of ethanol, ethyl acetate, and water.

2. A process which comprises introducing a mixture of ethanol, ethyl acetate, methyl ethyl ketone and water into a first distillation zone, removing as bottoms a mixture of methyl ethyl ketone and no more than two of ethanol, ethyl acetate and water, removing as overhead an azeotropic mixture of ethanol, ethyl acetate, and water having a boiling point of 70.3° C. at 760 mm. of Hg, introducing water and said azeotropic mixture into an extraction zone, removing raffinate containing ethyl acetate and water and extract containing ethanol, ethyl acetate and water, introducing the raffinate into a concentration distillation zone, removing ethyl acetate as bottoms and an azeotropic mixture of ethyl acetate and water having a boiling point of 70.4° C. at 760 mm. of Hg as overhead, and introducing said azeotropic mixture of ethyl acetate and water and the extract from the extraction zone to a second concentration distillation zone, removing a mixture of water and ethanol as bottoms from said second concentration distillation zone, removing as overhead an azeotropic mixture of ethanol, ethyl acetate, and water having a boiling point of 70.3° C. at 760 mm. of Hg and recycling said azeotropic mixture of ethanol, ethyl acetate and water to said extraction zone, separating water from said bottoms mixture of water and ethanol, and recycling said water to said extraction zone.

3. A process for separating into components a mixture of ethanol, ethyl acetate, methyl ethyl ketone and water containing ethanol and water in amounts in excess of those needed to remove all of the ethyl acetate as part of a ternary azeotropic mixture of ethanol, ethyl acetate and water with a boiling point of 70.3° C. which comprises passing said mixture of ethanol, ethyl acetate, methyl ethyl ketone and water into a first distillation zone, removing as bottoms a mixture of ethanol, methyl ethyl ketone and water, removing overhead said azeotropic mixture of ethanol, ethyl acetate and water with a boiling point of 70.3° C., charging water and said overhead azeotropic mixture of ethanol, ethyl acetate and water into an extraction zone, removing raffinate containing ethyl acetate and water and extract containing ethanol, ethyl acetate and water, introducing the raffinate into a concentration distillation zone, removing ethyl acetate as bottoms and an azeotropic mixture of ethyl acetate and water having a boiling point of 70.4° C. at 760 mm. of Hg as overhead, and introducing said azeotropic mixture of ethyl acetate and water and the extract from the extraction zone to a second concentration distillation zone, removing a mixture of water and ethanol as bottoms from said second concentration distillation zone, removing as overhead an azeotropic mixture of ethanol, ethyl acetate, and water having a boiling point of 70.3° C. at 760 mm. of Hg and recycling said azeotropic mixture of ethanol, ethyl acetate and water to said extraction zone, separating water from said bottoms mixture of water and ethanol, and recycling said water to said extraction zone.

4. A process for separating into components a mixture of ethanol, ethyl acetate, methyl ethyl ketone and water containing ethyl acetate and water in amounts in excess of those needed to remove all of the ethanol as part of a ternary azeotropic mixture of ethanol, ethyl acetate and water with a boiling point of 70.3° C., which comprises passing said mixture of ethanol, ethyl acetate, methyl ethyl ketone and water into a distillation zone, removing as bottoms a mixture of ethyl acetate, methyl ethyl ketone, and water, removing overhead an azeotropic mixture of ethanol, ethyl acetate and water with a boiling point of 70.3° C., introducing water and said azeotropic mixture into an extraction zone, removing raffinate containing ethyl acetate and water and extract containing ethanol, ethyl acetate and water, introducing the raffinate into a concentration distillation zone, removing ethyl acetate as bottoms and an azeotropic mixture of ethyl acetate and water having a boiling point of 70.4° C. at 760 mm. of Hg as overhead, and introducing said azeotropic mixture of ethyl acetate and water and the extract from the extraction zone to a second concentration distillation zone, removing a mixture of water and ethanol as bottoms from said second concentration distillation zone, removing as overhead an azeotropic mixture of ethanol, ethyl acetate, and water having a boiling point of 70.3° C. at 760 mm. of Hg and recycling said azeotropic mixture of ethanol, ethyl acetate and water to said extraction zone, separating water from said bottoms mixture of water and ethanol, and recycling said water to said extraction zone.

5. A process for separating into components a mixture of ethanol, ethyl acetate, methyl ethyl ketone and water containing ethanol and ethyl acetate in amounts in excess of those needed to remove all of the water as part of a ternary azeotropic mixture of ethanol, ethyl acetate, and water with a boiling point of 70.3° C., which comprises passing said mixture of ethanol, ethyl acetate, methyl ethyl ketone, and water into a first distillation zone, removing as bottoms a mixture of ethanol, ethyl acetate, and methyl ethyl ketone, removing overhead an azeotropic mixture of ethanol, ethyl acetate, and water with a boiling point of 70.3° C., passing water and said mixture of ethanol, ethyl acetate and water into an extraction zone, removing raffinate containing ethyl acetate and water and extract containing ethanol, ethyl acetate and water, introducing the raffinate into a concentration distillation zone, removing ethyl acetate as bottoms and an azeotropic mixture of ethyl acetate and water having a boiling point of 70.4° C. at 760 mm. Hg as overhead, and introducing said azeotropic mixture of ethyl acetate and water and the extract from the extraction zone to a second concentration distillation zone, removing a mixture of water and ethanol as bottoms from said second concentration distillation zone, removing as overhead an azeotropic mixture of ethanol, ethyl acetate, and water having a boiling point of 70.3° C. at 760 mm. of Hg and recycling said azeotropic mixture of ethanol, ethyl acetate and water to said extraction zone, separating water from said bottoms mixture of water and ethanol, and recycling said water to said extraction zone.

6. A process which comprises passing a mixture of ethanol, ethyl acetate, and water containing ethanol and water in amounts in excess of those necessary to remove all of the ethyl acetate as a ternary azeotropic mixture of ethanol, ethyl acetate and water with a boiling point of 70.3° C. into a distillation zone, removing a mixture of ethanol and water from said distillation zone as bottoms, removing as overhead said ternary azeotropic mixture of ethanol, ethyl acetate and water with a boiling point of 70.3° C., introducing water and said azeotropic mixture into an extraction zone, removing raffinate containing ethyl acetate and water and extract containing ethanol, ethyl acetate and water, introducing the raffinate into a concentration distillation zone, removing ethyl acetate as bottoms and an azeotropic mixture of ethyl acetate and water having a boiling point of 70.4° C. at 760 mm. of Hg as overhead, and introducing said azeotropic mixture and the extract from the extraction zone to a second concentration distillation zone, removing a mixture of water and ethanol as bottoms from said second concentration distillation zone, and removing as overhead an azeotropic mixture of ethanol, ethyl acetate, and water having a boiling point of 70.3° C. at 760 mm. of Hg.

7. A process which comprises introducing a mixture of ethanol, methyl ethyl ketone and water into a first distillation zone, said mixture containing no more than two of ethanol, methyl ethyl ketone, and water in amounts in excess of those needed to remove all of the ethanol, methyl ethyl ketone and water as a ternary azeotrope with a boiling point of 73.2° C. at 760 mm. of Hg, removing as bottoms from said first distillation zone a mixture of no more than two of said ethanol, methyl ethyl ketone and water and removing as overhead from said first distillation zone an azeotropic mixture of ethanol, methyl ethyl ketone and water boiling at 73.2° C. at 760 mm. of Hg, charging methanol and said azeotropic mixture to a second distillation zone and removing overhead from said second distillation zone an azeotropic mixture of methyl ethyl ketone and methanol having a boiling point of 63.8° C. at 760 mm. of Hg.

8. A process which comprises introducing a mixture of ethanol, methyl ethyl ketone and water into a first distillation zone, said mixture containing ethanol and water in amounts in excess of those needed to remove all of the methyl ethyl ketone as part of an azeotropic mixture of ethanol, methyl ethyl ketone and water having a boiling point of 73.2° C. at 760 mm. of Hg, removing from said first distillation zone as bottoms a mixture of ethanol and water, removing as overhead from said first distillation zone an azeotropic mixture of ethanol, methyl ethyl ketone and water boiling at 73.2° C. at 760 mm. of Hg, charging methanol and said azeotropic mixture to a second distillation zone and removing overhead from said second distillation zone an azeotropic mixture of methyl ethyl ketone and methanol having a boiling point of 63.8° C. at 760 mm. of Hg.

9. A process which comprises introducing a mixture of ethanol, methyl ethyl ketone and water into a first distillation zone, said mixture containing methyl ethyl ketone and water in amounts in excess of those needed to remove all of the ethanol as part of an azeotropic mixture of ethanol, methyl ethyl ketone and water having a boiling point of 73.2° C. at 760 mm. of Hg, removing said azeotropic mixture of ethanol, methyl ethyl ketone and water as overhead from said first distillation zone, removing as bottoms a binary mixture of methyl ethyl ketone and water from said first distillation zone, introducing said mixture of methyl ethyl ketone and water to a second distillation zone, removing water as bottoms and an azeotropic mixture of methyl ethyl ketone and water having a boiling point of 73.5° C. at 760 mm. of Hg from said second distillation zone, introducing methanol and said azeotropic mixture of methyl ethyl ketone and water to a third distillation zone, removing water as bottoms and an azeotropic mixture containing methyl ethyl ketone and methanol from said third distillation zone, and separating said azeotropic mixture of methyl ethyl ketone and methanol in a pressure distillation zone.

10. A process which comprises introducing a mixture of ethanol, methyl ethyl ketone and water into a first distillation zone, said mixture containing ethanol and methyl ethyl ketone in amounts in excess of those needed to remove all of the water as part of an azeotropic mixture of ethanol, methyl ethyl ketone, and water, having a boiling point of 73.2° C. at 760 mm. of Hg, removing as overhead from said first distillation zone said azeotropic mixture of ethanol, methyl ethyl ketone and water, removing as bottoms a binary mixture of ethanol and methyl ethyl ketone, introducing said mixture of ethanol and methyl ethyl ketone into a second distillation zone, removing ethanol as bottoms and an azeotropic mixture of ethanol and methyl ethyl ketone having a boiling point of 74.8° C. at 760 mm. of Hg overhead from said second distillation zone, introducing methanol and said mixture of ethanol and methyl ethyl ketone to a third distillation zone and removing ethanol as bottoms and an azeotropic mixture of methyl ethyl ketone and methanol having a boiling point of 63.8° C. at 760 mm. of Hg overhead from said third distillation zone.

11. A process which comprises introducing a mixture of ethanol and methyl ethyl ketone to a distillation zone, removing ethanol as bottoms and an azeotropic mixture of ethanol and methyl ethyl ketone having a boiling point of 74.8° C. at 760 mm. of Hg overhead from said distillation zone, introducing methanol and said azeotropic mixture of ethanol and methyl ethyl ketone to a second distillation zone and removing ethanol as bottoms and an azeotropic mixture of methyl ethyl ketone and methanol having a boiling point of 63.8° C. at 760 mm. of Hg overhead from said second distillation zone.

12. A process which comprises introducing a mixture of ethyl acetate and methyl ethyl ketone to a distillation zone, removing ethyl acetate as bottoms, and an azeotropic mixture of ethyl acetate and methyl ethyl ketone having a boiling point of 76.7° C. at 760 mm. of Hg, as overhead, introducing water and the azeotropic mixture of ethyl acetate and methyl ethyl ketone to a second distillation zone, and removing methyl ethyl ketone as bottoms, and an azeotropic mixture of ethyl acetate and water having a boiling point of 70.4° C. at 760 mm. of Hg as overhead from the second distillation zone.

References Cited in the file of this patent

UNITED STATES PATENTS

| | | |
|---|---|---|
| 1,454,462 | Backhans | May 8, 1923 |
| 1,583,314 | Rodebush | May 4, 1926 |
| 2,099,475 | Giesen et al. | Nov. 16, 1937 |
| 2,324,255 | Britton et al. | July 13, 1943 |
| 2,454,447 | Harney, Jr., et al. | Nov. 23, 1948 |
| 2,487,124 | Gathman et al. | Nov. 8, 1949 |
| 2,528,761 | Lake et al. | Nov. 7, 1950 |
| 2,607,719 | Eliot et al. | Aug. 19, 1952 |

FOREIGN PATENTS

| | | |
|---|---|---|
| 304,756 | Great Britain | Nov. 28, 1929 |